United States Patent
Gautama et al.

(10) Patent No.: US 9,485,576 B2
(45) Date of Patent: *Nov. 1, 2016

(54) CONTROL OF A LOUDSPEAKER OUTPUT

(71) Applicant: NXP B.V., Eindhoven (NL)

(72) Inventors: Temujin Gautama, Boutersem (BE); Bram Hedebouw, Heverlee (BE)

(73) Assignee: NXP B.V., Eindhoven (NL)

( * ) Notice: Subject to any disclaimer, the term of this patent is extended or adjusted under 35 U.S.C. 154(b) by 3 days.

This patent is subject to a terminal disclaimer.

(21) Appl. No.: 14/663,046

(22) Filed: Mar. 19, 2015

(65) Prior Publication Data

US 2016/0073196 A1    Mar. 10, 2016

Related U.S. Application Data

(63) Continuation of application No. 13/360,427, filed on Jan. 27, 2012, now Pat. No. 9,014,380.

(30) Foreign Application Priority Data

Feb. 15, 2011 (EP) .................................. 11154581

(51) Int. Cl.
*H03G 11/00* (2006.01)
*H04R 3/00* (2006.01)
*H04L 25/06* (2006.01)

(52) U.S. Cl.
CPC .............. *H04R 3/007* (2013.01); *H04R 3/002* (2013.01); *H04L 25/06* (2013.01)

(58) Field of Classification Search
CPC ........ H04R 3/002; H04R 3/007; H04R 9/06; H04R 3/00; H04R 3/04

USPC ......... 381/55, 59, 96, 71.12, 71, 12; 700/94; 330/85, 279

See application file for complete search history.

(56) References Cited

U.S. PATENT DOCUMENTS

| | | | |
|---|---|---|---|
| 3,588,726 A * | 6/1971 | Wallace | H03G 11/00 330/145 |
| 5,721,784 A | 2/1998 | Bernardo | |
| 6,201,873 B1 | 3/2001 | Dal Farra | |
| 6,418,231 B1 | 7/2002 | Carver | |
| 6,584,204 B1 | 6/2003 | Al-Aii et al. | |

(Continued)

FOREIGN PATENT DOCUMENTS

| | | |
|---|---|---|
| CN | 101924972 A | 12/2010 |
| CN | 101953174 A | 1/2011 |

(Continued)

OTHER PUBLICATIONS

Klippel, W. "Assessment of Voice-Coil Peak Displacement $X_{max}$"; J. Audio Eng. Soc., vol. 51, No. 5, pp. 307-321 (May 2003).

(Continued)

*Primary Examiner* — Vivian Chin
*Assistant Examiner* — Ubachukwu Odunukwe

(57) ABSTRACT

A loudspeaker drive circuit comprises an input for receiving an audio signal and a signal processor for processing the audio signal before application to the loudspeaker. The signal processor processes the audio signal to derive a loudspeaker drive signal which results in the loudspeaker membrane reaching its maximum displacement in both directions of diaphragm displacement.

14 Claims, 3 Drawing Sheets

(56) References Cited

U.S. PATENT DOCUMENTS

| | | |
|---|---|---|
| 6,931,135 B1 | 8/2005 | Kohut |
| 7,274,793 B2 | 9/2007 | Combest et al. |
| 7,372,966 B2 | 5/2008 | Bright |
| 8,577,047 B2 | 11/2013 | Gautama |
| 2005/0031138 A1 | 2/2005 | Browning et al. |
| 2005/0031139 A1 | 2/2005 | Browning et al. |
| 2005/0221867 A1 | 10/2005 | Zurek et al. |
| 2007/0242329 A1* | 10/2007 | Ballegaard ........... G02B 26/123 359/202.1 |
| 2010/0226592 A1 | 9/2010 | Ferguson |
| 2010/0316226 A1 | 12/2010 | Yoneda et al. |
| 2010/0316242 A1 | 12/2010 | Cohen et al. |
| 2012/0106750 A1* | 5/2012 | Thormundsson ...... H04R 3/007 381/71.12 |
| 2012/0281844 A1 | 11/2012 | Luo et al. |
| 2012/0300949 A1 | 11/2012 | Rauhala et al. |
| 2013/0022208 A1 | 1/2013 | Dhuyvetter |
| 2013/0077795 A1 | 3/2013 | Risbo et al. |

FOREIGN PATENT DOCUMENTS

| | | |
|---|---|---|
| EP | 2 348 750 A1 | 7/2011 |
| GB | 2 324 888 A | 11/1998 |
| JP | 63-142989 U | 9/1988 |
| JP | 2006-197206 A | 7/2006 |
| JP | 2007-312404 A | 11/2007 |
| JP | 2009-159537 A | 7/2009 |
| JP | 2009-253926 A | 10/2009 |

OTHER PUBLICATIONS

Extended European Search Report for European patent appln. No. 11154581.0 (Jul. 29, 2011).

Klippel, "Prediction of Speaker Performance at High Amplitudes", Audio Engineering Society Convention Paper 5418, presented at 111th Convention New York, NY Sep. 21-24, 2001.

* cited by examiner

CONTROL OF A LOUDSPEAKER OUTPUT

CROSS REFERENCE TO RELATED APPLICATIONS

This application is a continuation of copending U.S. patent application Ser. No. 13/360,427 filed on Jan. 27, 2012, which claims priority under 35 USC 119 to European Patent Application No. 11154581.0 filed on Feb. 15, 2011, the contents of which are incorporated by reference herein.

BACKGROUND

This invention relates to the control of the output of a loudspeaker, and relates to a loudspeaker circuit and signal processing method.

An important cause of loudspeaker failures is a mechanical defect that arises when the loudspeaker diaphragm is displaced beyond a certain limit, which is usually supplied by the manufacturer. Going beyond this displacement limit either damages the loudspeaker immediately, or can considerably reduce its expected life-time.

Furthermore, the combination of the use of small loudspeakers and the demand for high acoustic output results in the need for loudness maximisation methods, but increases the risk of exceeding the diaphragm displacement limit, also referred to as the 'cone excursion' limit. Small loudspeakers are also unable to efficiently reproduce low frequencies, so that a so-called loudspeaker linearisation method is often used to correct for this low efficiency. However, this also increases the risk of going beyond the displacement limit.

There exist several methods to limit the displacement of the diaphragm of a loudspeaker to provide loudspeaker protection.

One category consists of methods that process the input signal with variable cut-off filters (high-pass or other), the characteristics of which are controlled via a feedback loop. A displacement predictor is used to control the filters. Another category uses a feedforward strategy in which the signal is processed with a bank of band-pass filters with adjustable gains in such a way that excess excursion is prevented (by attenuating only the frequency bands that cause most excursion).

The use of a low frequency shelving and notch filter has also been proposed in a feedforward approach (in U.S. Pat. No. 7,372,966), which is controlled via the displacement predictor in a feedforward manner, using a model of the loudspeaker to pre-process the signal before sending it to the amplifier/loudspeaker.

U.S. Pat. No. 6,201,873 describes a setup for protecting against excess audio distortion (mainly caused by cone excursion), or driving the loudspeaker to its maximum (to maximum cone excursion). It uses a cone excursion transfer function (or a maximal voltage transfer function) module, the output of which is used to control a variable gain on the input. U.S. Pat. No. 6,201,873 suggests the use of a transfer function to give maximal voltage leading to just acceptable distortion, which is the maximal voltage that can be applied per frequency without causing excess distortion. The distortion being considered is that arising from excess cone displacement (no distortion in the converter and amplifier is considered).

This invention is based on the recognition that in many loudspeakers, the positive (outward-moving) and negative (inward-moving) diaphragm displacement peaks are not symmetrical when the loudspeaker is driven towards its displacement limit. In the following description, it is arbitrarily assumed that the negative diaphragm displacement is larger in absolute value than the positive displacement when the loudspeaker is driven towards its displacement limit, but the opposite may be true. This is often due to the asymmetry of the nonlinear behaviour of the loudspeaker with respect to the diaphragm displacement.

If the (measured or predicted) diaphragm displacement is limited by means of a protection scheme, it is likely that only the negative displacement peak is limited, while the positive peak never reaches the displacement limit. Thus, a protection scheme will prevent the maximum loudness being reached.

SUMMARY

According to the invention, there is provided a loudspeaker drive circuit comprising:
an input for receiving an audio signal;
a signal processor for processing the audio signal before application to the loudspeaker, and adapted to process the audio signal to derive a loudspeaker drive signal which results in the loudspeaker membrane reaching its maximum displacement in both directions of diaphragm displacement.

In this way, the invention provides a system to process an audio input signal (which could be used to drive a loudspeaker) such that the positive and negative displacement peaks are symmetrical, and that both reach their respective displacement limits. As a result, the peak-to-bottom displacement can be increased, which results in an increased sound level of the loudspeaker output.

It is noted that the "input for receiving an audio signal" is the input to the signal processor, and there may be other components between that input and an external input to the loudspeaker drive circuit.

The signal which is processed to derive the symmetrical displacement limit drive of the loudspeaker can comprise a signal which has been subjected to loudness maximisation. However, it may instead be a signal which has been subjected to processing (e.g., clipping) for loudspeaker protection. In both cases, it is a peak audio signal which is processed to ensure that the loudspeaker displacement limit is reach in both directions. Before the processing of the invention, the audio signal (either maximised or processed for protection) does not result in the maximum displacement in both directions. Typically, maximum displacement arises in one direction of diaphragm displacement only.

The circuit can comprise a maximisation unit for generating a loudspeaker drive signal which would drive the loudspeaker such that the maximum displacement in one direction of diaphragm displacement is reached. This can comprise a conventional loudness maximisation unit, which does not take into account the asymmetry of the loudspeaker.

Alternatively, the invention can be applied to an audio signal from a loudspeaker protection unit.

An adder can be provided for adding a dc offset to the output of the maximisation unit/protection unit. This dc offset then shifts the loudspeaker drive signal to provide the required symmetry which takes account of the nonlinear and asymmetrical characteristics of the loudspeaker.

To derive the asymmetrical characteristics, a diaphragm displacement predictor module can be used, and the dc offset can then be adjustable by the diaphragm displacement predictor module.

A gain element can be used for applying a gain to the output of the adder. This then ensures the displacement limit is reached. The gain can also be adjustable by a diaphragm displacement predictor module.

Instead of an adder and gain element, an asymmetrical limiter unit can be provided for applying a gain and asymmetrical limiter to the output of the maximisation unit. Again, the asymmetrical limiter unit can be controlled by a diaphragm displacement predictor module.

The circuit preferably comprises a loudspeaker, and it can be part of a portable device such as mobile telephone. The loudspeaker comprises a loudspeaker membrane which is displaceable from a rest position in two (opposite) directions.

The invention also provides a method of processing an audio input signal to derive a loudspeaker drive signal, comprising:

processing the audio signal to derive a loudspeaker drive signal which results in the loudspeaker membrane reaching its maximum displacement in both directions of diaphragm displacement.

BRIEF DESCRIPTION OF THE DRAWINGS

Examples of the invention will now be described in detail with reference to the accompanying drawings, in which.

DETAILED DESCRIPTION

The invention provides a loudspeaker drive circuit in which an audio signal is adapted before being applied to a loudspeaker. The adaptation is such an audio signal, when used to drive a loudspeaker for which the circuit is designed, results in the loudspeaker membrane reaching its maximum displacement in both directions of diaphragm displacement. In this way, the loudspeaker provides the greatest possible sound pressure, for example when it is driven to maximum loudness.

An example of the invention is described based on a digital implementation (requiring a digital-to-analog converter). It can also be implemented in the analog domain.

The invention can be applied to loudness maximisation or loudspeaker protection systems. The following examples are based on the application of the invention to systems which incorporate loudness maximisation.

For the following description, it is assumed that a loudness maximisation module processes an input signal in such a way that the processed signal drives the loudspeaker to, but not beyond, its negative peak displacement, and that the positive peak displacement does not reach the limit value. It can alternatively be that the positive peak is limited and that the negative peak does not reach the limit value, depending on the loudspeaker.

The positive and negative displacement peaks can have different values, and the proposed method can be used to align the positive and negative peaks to the respective displacement limits.

Figure 1:
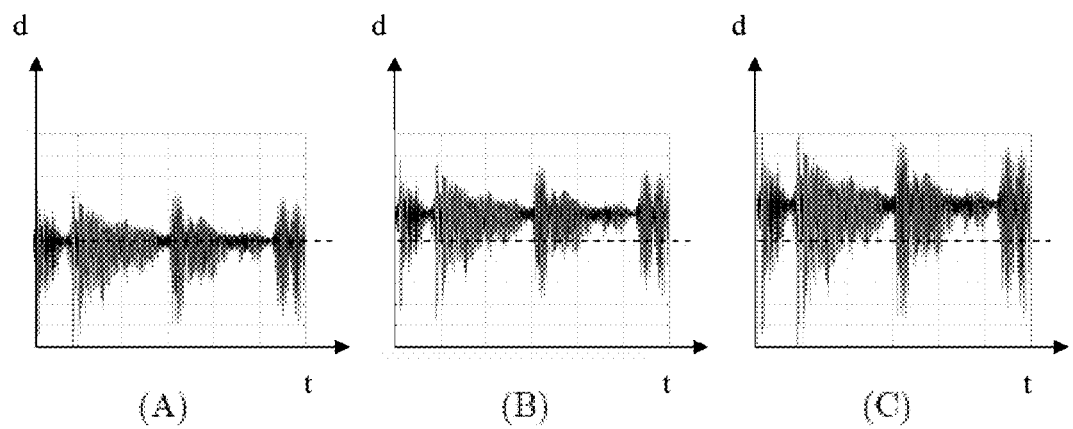
FIG. 1 shows the signal processing adopted by the system and method of the invention.

The basic principle is shown in FIG. 1.

In FIG. 1A, the diaphragm displacement is shown as a function of time for an arbitrary sound track, which is processed in such a way that the maximal (negative) displacement is at 1 mm, which is the displacement limit of the loudspeaker. The positive peak is much smaller (approximately 0.49 mm) due to the asymmetry of the nonlinear behaviour of the loudspeaker.

By adding a DC-value to the audio signal, the diaphragm displacement can be shifted upwards or downwards, and it can be chosen such that the positive and negative peak displacements are symmetrical, as shown in FIG. 1B.

The DC-value that is required for this can be predicted from a loudspeaker model, or it can be determined iteratively while measuring the diaphragm displacement. As a result, the positive and negative peaks are at ±0.74 mm, which is below the displacement limit.

An additional gain can be applied such that the positive and negative displacement peaks coincide with the respective displacement limits (+1 mm and −1 mm in this example).

FIG. 1C shows the effect of adding a DC-value and an additional gain.

Figure 2:
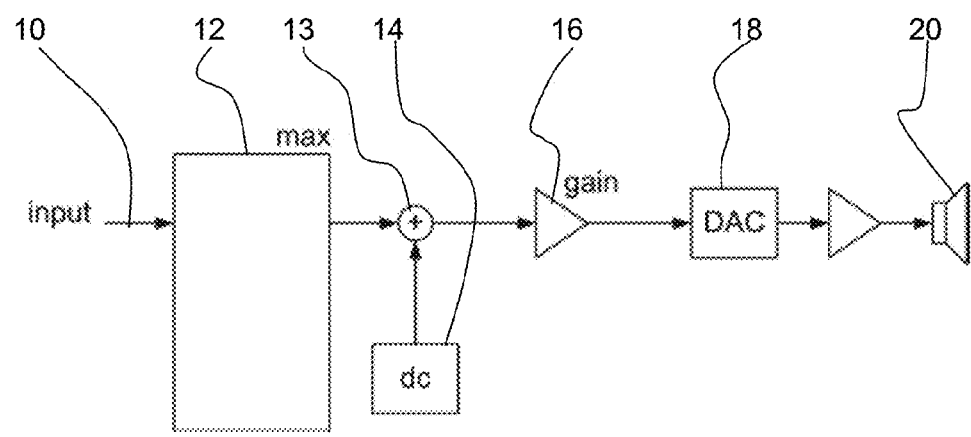
FIG. 2 shows a first example of loudspeaker drive circuit of the invention.

A first embodiment of circuit of the invention is shown in FIG. 2.

The loudspeaker drive circuit comprises an input 10 for receiving an audio signal. This audio signal can be a digital signal which would be suitable for driving the speaker (after digital to analog conversion) or it can be an analog signal. The processing implemented by the additional circuit elements of the invention provide final adjustments to the audio signal.

The circuit comprises a signal processor for processing the audio signal before application to the loudspeaker. In the example of FIG. 2, the signal processor comprises an adder 13 for adding a dc value provided by a dc offset unit 14, and a gain element 16 for applying a gain. These units process the audio signal after a (conventional) loudness maximisation in unit 12. The purpose of the dc offset and gain is to derive a loudspeaker drive signal which results in the loudspeaker membrane reaching its maximum displacement in both directions of diaphragm displacement when the maximum loudness drive signal is provided.

The maximisation module 12 performs (fixed or adaptive) processing of the input signal 10. The DC-value 14 and an additional scaling 16 are added to the processed signal, and it is sent to a digital-to-analog converter 18 and the loudspeaker 20.

The DC- and gain-values are set such that the positive and negative peak diaphragm displacements both reach their respective limits. These values are fixed and can be determined for example by applying a given test sequence.

The test sequence comprises a drive signal which is multiplied by a gain. The gain is increased until the negative peak value of the excursion reaches the maximum allowed excursion (assuming the negative excursion peak is reached first).

The positive and negative excursion peaks at the point when the negative peak value of the excursion has been reached can be denoted by, respectively, $x^+$ and $x^-$. Next, the DC value is determined for which the positive peak excursion value equals $(x^+-x^-)/2$. In this way, the response is shifted until the positive and negative excursion values are equal (i.e. the shift from FIG. 1A to FIG. 1B).

The value for the gain element is then determined as the gain factor that is required to increase the peak excursion value to the maximally allowed value (i.e. the shift from FIG. 1B to FIG. 1C).

The test sequence can be applied to one speaker of a given speaker design, which assumes that the speaker nonlinearities are uniform across samples of the same design. A laser displacement meter can be used to measure the excursion points, and thereby determine when the excursion limit has been reached in one direction (by comparison with a manufacturer-supplied value), as well as measuring the excursion reached in the other direction.

To implement the invention in a loudspeaker protection system, the loudness maximisation unit 12 is replaced by a protection unit. This suffers the same problem that it gives rise to a drive signal which only makes the loudspeaker reach its displacement limit in one direction.

Figure 3:
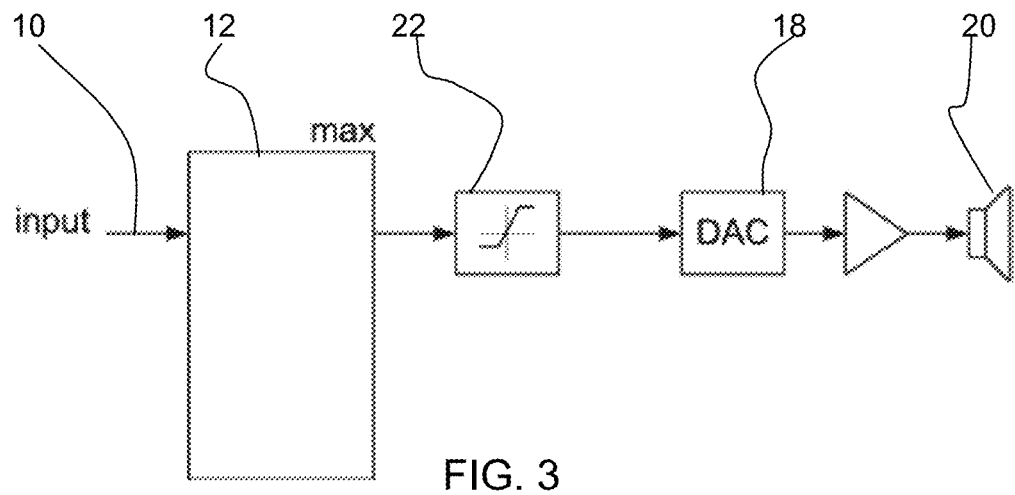
FIG. 3 shows a second example of loudspeaker drive circuit of the invention.

A second embodiment is shown in FIG. 3. The DC-shift and gain are replaced by an asymmetrical limiter implemented by an asymmetrical limiter unit 22. The limiter applies a gain and limits the positive and negative peaks to different values. The parameters of the asymmetrical limiter are set such that the positive and negative peak diaphragm displacements both reach their respective limits. These values can be determined in the same way as outlined above.

Figure 4:
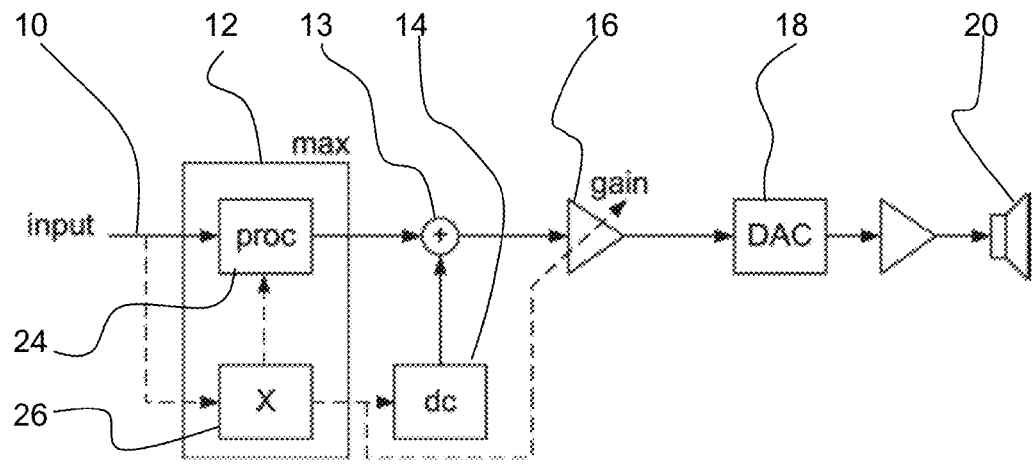
FIG. 4 shows a third example of loudspeaker drive circuit of the invention.

A third embodiment is shown in FIG. 4. It is an extension of the first embodiment. The maximisation module 12 consists of a processing block 24 that is controlled by an excursion module 26, which consists of a diaphragm displacement predictor module, which obtains a measurement or a prediction of the diaphragm displacement. A number of control signals can be derived from this measurement or prediction, including control parameters for the dc offset unit 14. This block can be used to control the DC- and gain-value that are required to render the peak displacements symmetrical and corresponding to their respective limit values.

For instance, the gain can be set to a fixed value, and the DC-value can be set to zero if the expected peak diaphragm displacement is below threshold, and to a fixed value otherwise. If the excursion module is able to predict the asymmetrical excursion peaks (for instance, if the excursion module takes into account the asymmetry of the nonlinear behaviour of the loudspeaker), the required DC-value can be estimated in the excursion module.

The adaptive processing (maximisation and/or protection) can for example use filters, an adaptive gain element and a dynamic range compression module. Typically, the parameters of the processing blocks are controlled in such a way that the expected peaks of the diaphragm displacement coincide with the maximally allowed values (maximisation), and/or that the diaphragm displacement does not exceed the maximally allowed value (protection). The adaptive gain can thus be dependent on the predicted diaphragm displacement in response to the actual audio signal.

Figure 5:
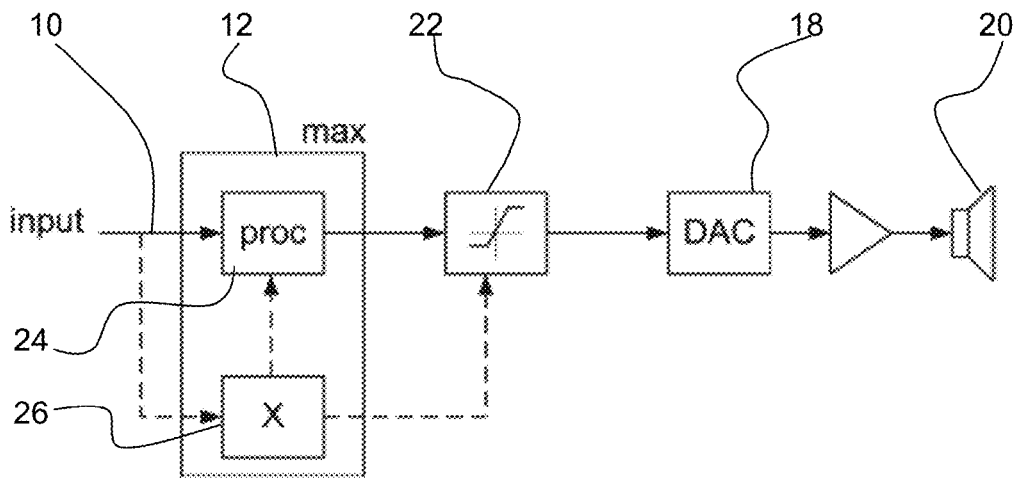
FIG. 5 shows a fourth example of loudspeaker drive circuit of the invention.

A fourth embodiment is shown in FIG. 5. It is an extension of the second embodiment. The maximisation module 12 consists of a processing block that is controlled by an excursion module 26, which again consists of a measurement or a prediction of the diaphragm displacement. This block can then be used to control the parameters of the asymmetrical limiter function. For instance, the gain can again be set to a fixed value and the positive and negative limiting levels can be set to predefined levels if the expected peak diaphragm exceeds a threshold value. If the excursion module is able to predict the asymmetrical excursion peaks (for instance, if the excursion module takes into account the asymmetry of the nonlinear behaviour of the loudspeaker), the required limiting levels can be estimated in the excursion module.

The invention can be used in combination with loudness maximisation algorithms that incorporate a loudspeaker protection by limiting the diaphragm displacement. The effect will be an increase of the gain that can be applied without exceeding the displacement limit.

The maximisation unit can be conventional, for example a known approach is outlined in U.S. Pat. No. 6,201,873. The loudness maximisation unit can always maximise loudness, or does it can only come into play if there is a maximum volume setting applied to the speaker. For example, the highest volume can correspond to maximisation, while the lower volumes used fixed gains. Another possibility is that all volume levels are derived from a maximised signal, so that volume control provides attenuation of the maximised signal.

As mentioned above, the invention can be applied in the analog domain instead of the in the digital domain.

The invention can be used for maximising the loudness in sound reproduction systems, while protecting the loudspeakers. An important application is in mobile phones, where lower-quality loudspeakers are often employed, but high acoustic output is desired.

Figure 6:
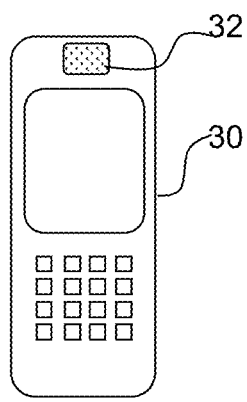
FIG. 6 shows a mobile telephone in which the loudspeaker system can be implemented.

FIG. 6 shows a mobile phone 30 including the loudspeaker system 32 of the invention.

Various modifications will be apparent to those skilled in the art.

The invention claimed is:

1. A loudspeaker drive circuit, comprising;
an input to receive an audio signal;
a signal processor to generate a drive signal based on the input audio signal, to output the drive signal to a loudspeaker, the signal processor comprising;
a DC offset unit configured to generate a DC offset that shifts a peak positive diaphragm displacement and a peak negative diaphragm displacement to be symmetrical relative to no positive or negative diaphragm displacement;
an adder connected to add the DC offset from the DC offset unit to the received input audio signal and to output an added signal;
a gain element controlled to apply gain to the added signal such that the peak positive diaphragm displacement and the peak negative diaphragm displacement of the loudspeaker reach respective displacement limits of the loudspeaker.

2. The loudspeaker drive circuit of claim 1, wherein the signal processor is configured to incorporate the DC offset in the drive signal in each direction of excursion of a loudspeaker diaphragm.

3. The loudspeaker drive circuit of claim 2, wherein the signal processor is configured to determine a different amount of the DC offset to be incorporated to the drive signal in each direction asymmetrically.

4. The loudspeaker drive circuit of claim 1, wherein the signal processor is configured to incorporate a zero DC offset if the peak positive and peak negative displacement of the loudspeaker diaphragm will be below a predefined maximum value.

5. The loudspeaker drive circuit of claim 4, wherein the signal processor is configured to set a gain of the drive signal to a fixed value when the zero DC offset is incorporated in the drive signal.

6. A loudspeaker driver for generating a drive signal for controlling a loudspeaker, the loudspeaker driver, when executed by a processor, performs an operation, the operation includes:
receiving an audio signal;

generating a drive signal based on the audio signal to drive the loudspeaker, wherein generating the drive signal comprises;

generating a DC offset that shifts a peak positive diaphragm displacement and a peak negative diaphragm displacement to be symmetrical relative to no positive or negative diaphragm displacement;

adding the DC offset from the DC offset unit to the received audio signal to generate an added signal; and applying gain to the added signal such that the peak positive diaphragm displacement and the peak negative diaphragm displacement of the loudspeaker reach respective displacement limits of the loudspeaker.

7. The loudspeaker driver of claim 6, wherein the adding comprises adding the DC offset in each direction of excursion of the diaphragm of the loudspeaker.

8. The loudspeaker driver of claim 7, further including determining a different amount of the DC offset to be incorporated to the drive signal in each direction asymmetrically.

9. The loudspeaker driver of claim 8, including adding a zero DC offset when a displacement of the loudspeaker diaphragm will be below a predefined maximum value.

10. The loudspeaker driver of claim 9, including setting a gain of the drive signal to a fixed value when the zero DC offset is incorporated in the drive signal.

11. A method for operating a loudspeaker, the method comprising;

receiving an audio signal;

generating a drive signal based on the audio signal to drive a loudspeaker, wherein generating the drive signal comprises;

generating a DC offset that shifts a peak positive diaphragm displacement and a peak negative diaphragm displacement to be symmetrical relative to no positive or negative diaphragm displacement;

adding the DC offset from the DC offset unit to the received audio signal to generate an added signal; and applying gain to the added signal such that the peak positive diaphragm displacement and the peak negative diaphragm displacement of the loudspeaker reach respective displacement limits of the loudspeaker.

12. The method of claim 11, wherein the positive and negative displacement limits are predefined displacement distances beyond which the loudspeaker can be immediately damaged or beyond which the expected life-time of the loudspeaker can be considerably reduced.

13. The loudspeaker drive circuit of claim 1, wherein the positive and negative displacement limits are predefined displacement distances beyond which the loudspeaker can be immediately damaged or beyond which the expected life-time of the loudspeaker can be considerably reduced.

14. The loudspeaker driver of claim 6, wherein the positive and negative displacement limits are predefined displacement distances beyond which the loudspeaker can be immediately damaged or beyond which the expected life-time of the loudspeaker can be considerably reduced.

* * * * *